United States Patent [19]

Server Perez

[11] Patent Number: 4,989,889
[45] Date of Patent: Feb. 5, 1991

[54] FOLDABLE CHART FOR SHOPPING

[76] Inventor: Juan Server Perez, C.N. 332, Km. 164, 03750 Pedreguer, Spain

[21] Appl. No.: 295,747

[22] Filed: Jan. 10, 1989

[30] Foreign Application Priority Data

Jun. 28, 1988 [ES] Spain .................................. 8802023

[51] Int. Cl.⁵ .............................................. B62B 1/12
[52] U.S. Cl. ...................................... 280/40; 280/655; 280/47.29; 280/DIG. 3
[58] Field of Search ................ 280/654, 655, 40, 638, 280/38, 646, 652, 47.29, 47.28, DIG. 3

[56] References Cited

U.S. PATENT DOCUMENTS

| 3,348,857 | 10/1967 | Rollin | 280/654 |
|---|---|---|---|
| 4,335,895 | 6/1982 | Walker | 280/40 |
| 4,458,914 | 7/1984 | Holtz | 280/654 |
| 4,554,034 | 9/1925 | Richie | 280/654 |
| 4,570,958 | 2/1986 | Walker | 280/40 |
| 4,754,985 | 7/1988 | Im | 280/40 |

FOREIGN PATENT DOCUMENTS

| 1488011 | 2/1967 | France | 280/40 |
|---|---|---|---|
| 2567470 | 1/1986 | France | 280/652 |

Primary Examiner—David M. Mitchell
Attorney, Agent, or Firm—Darby & Darby

[57] ABSTRACT

Foldable cart for shopping having a rigid base for reinforcement of the bag bottom. Two frames carry the wheels on which the bag leans in the unfolded position during use. The frames allow the wheels to be folded beneath the rigid base. Bag supporting frameworks can be extended and folded by parallel sliding in order to allow extension for pulling the cart or folding to a bag of reduced size for hand transport. One of the frameworks is attached to the upper zone of the bag, pulling the latter for its extension or folding. The other framework has, close to an articulation axle at the rigid base of the bag, a piece provided with one or two lugs which pass through slots formed in the housing for articulation of the frameworks and the wheel frames and for automatic extension of the wheels.

7 Claims, 10 Drawing Sheets

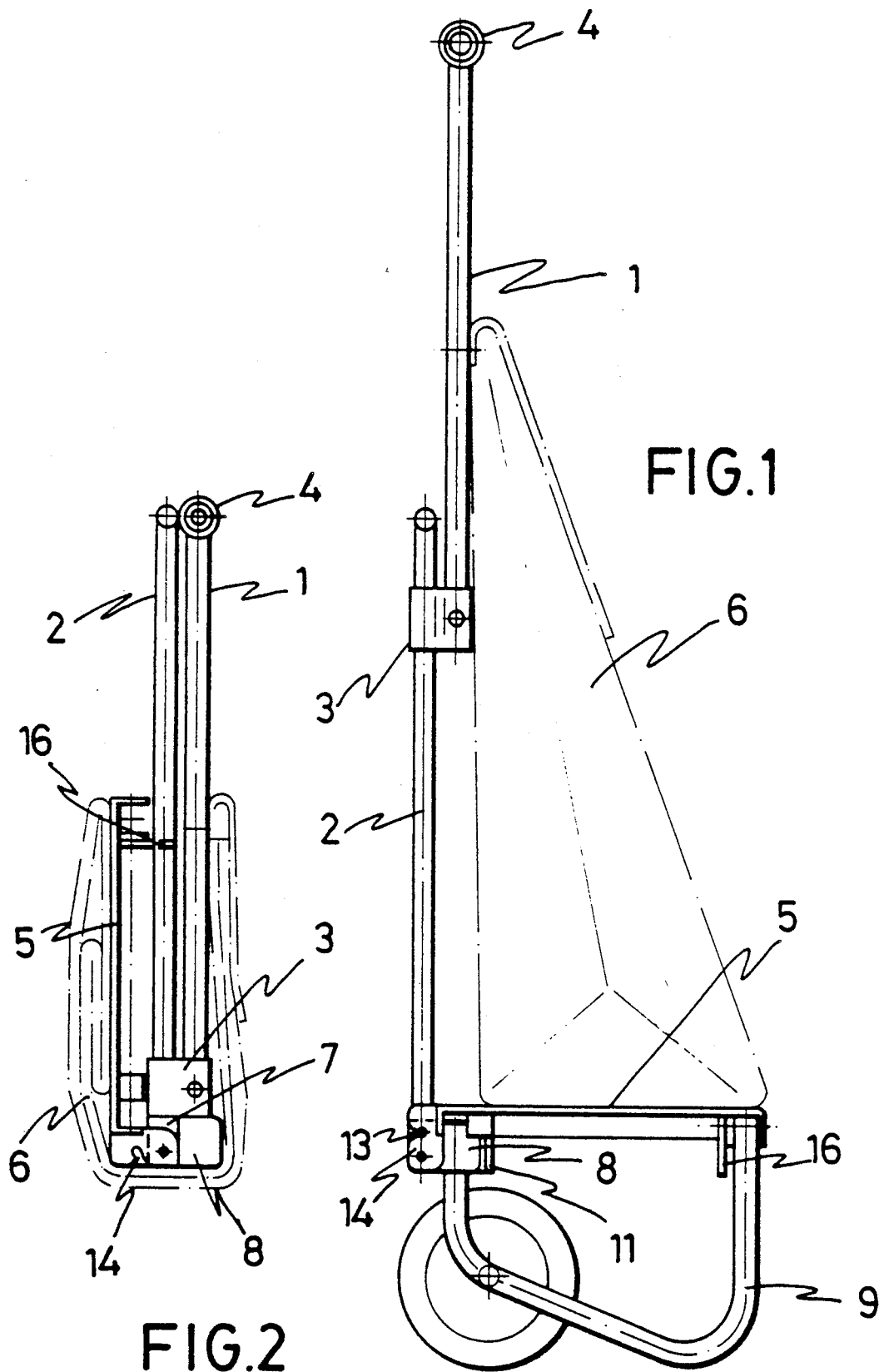

FOLDABLE CART FOR SHOPPING

The present invention relates to a foldable cart for shopping, of the type having a wheeled framework to which the bottom of the bag is attached. The framework allows the wheels to be folded under the base, and the bag-framework assembly can be folded until forming a bag which is held by a part of the framework with which the cart is pulled in the unfolded position.

In the prior art, the wheels of the cart are welded to corresponding frameworks, articulated to a resistant base situated beneath the bottom of the bag, the frameworks being folded.

In some cases, the bag handle is a double handle, formed by two "U"-tubes being parallelly displaced, which are extended only when the bag is pulled on its fixed wheels and are withdrawn in order to carry the bag hanging on the hand or on the arm of the user. These cases provide non-foldable bag.

Different types of frameworks allow their folding, together with the bag and the wheels, in order to convert the assembly into a bag of reduced size to be carried hanging on the user's arm until the moment when shopping is done, at which time the wheels are extended and unfolded so that the loaded bag leans on the wheels to make transport easier.

The object of the invention is to provide a foldable shopping cart of the type which can be converted into a bag of reduced size, wherein the bag and the wheels are automatically unfolded when one proceeds to extend both frameworks of the cart.

With this aim, one of the frameworks has been provided with points of junction over the top portion of the bag and the other framework is attached to the resistant plate which supports the bottom of the bag. They are retained in this unfolded position until it is desired to reduce the height of the seizing frameworks to fold the bag and the resistant base. At the side opposite that where the seizing frameworks are articulated, the base is provided with two plates with notches for fitting under pressure against the frameworks when the cart is folded.

At the parallel sleeves which are crossed by the seizing frameworks for their extension and folding, retaining means are provided to avoid untimely folding.

In a preferred embodiment of the invention, the retention means for maintaining the bag both in the folded and in the unfolded postions, can be improved to allow folding and unfolding without great effort while being sufficient to maintain the bag in its selected position.

In this regard, the piece disposed at the lower end of one of the seizing frameworks has a second lug, parallel to the first lug and having a higher flexibility index than the first lug so that, while the latter carries out the unfolding of the frameworks, the former fits in the working position of the resistant base. The latter is provided with two wide paths whereinto the ends of said framework articulate, so that the second lug passes through a guiding space, touching one of the walls and being sufficiently away from the opposite wall to provide the necessary room for the lateral movement of said lug. The lug is provided, at the surface that touches said wall, with a step which acts as an anchoring means on the upper edge of said path.

Double tubular parallel sleeves are provided with a quadrangular passage of the same section as the sliding frameworks, thereby being able to eliminate lateral movements.

One of the sockets of the double socket is provided with axial projections, coincident with each face, having inner notches, and provided with flexibility. A peripheral web of a ferrule provided at the end of the frame which is not attached to the resistant base engages the notches in the extended (unfolded) position of the parallel frameworks. This peripheral web constitutes the means by which the resistant base disengages the retaining lug from its penetration between the two lugs with which the terminal or prismatic piece that relates it to the other frame is provided.

For a better comprehension of the above description, the present specification has nine sheets of drawings attached thereto, showing the cart assembly in the extended (unfolded) and folded positions, as well as details of the elements by which the extension and folding are attained.

BRIEF DESCRIPTION OF THE DRAWINGS

FIG. 1 is a side elevational view of the framework and the bag in the unfolded position.

FIG. 2 is a side view of the cart completely folded.

Figure 3:
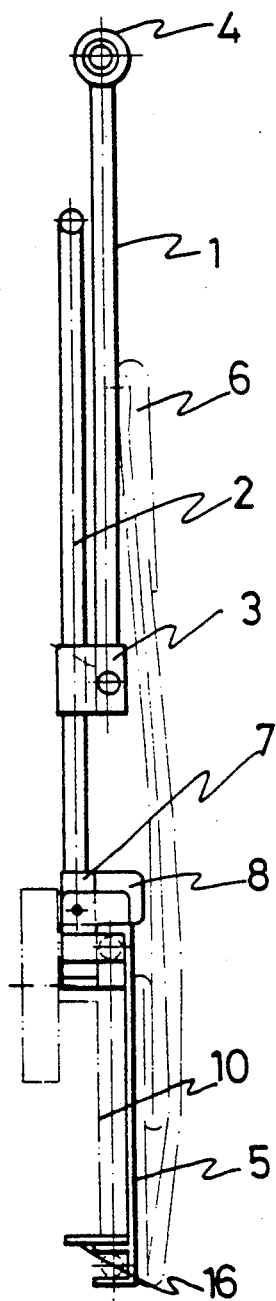
FIG. 3 is a side elevational view at the beginning of the folding operation.
Figure 4:
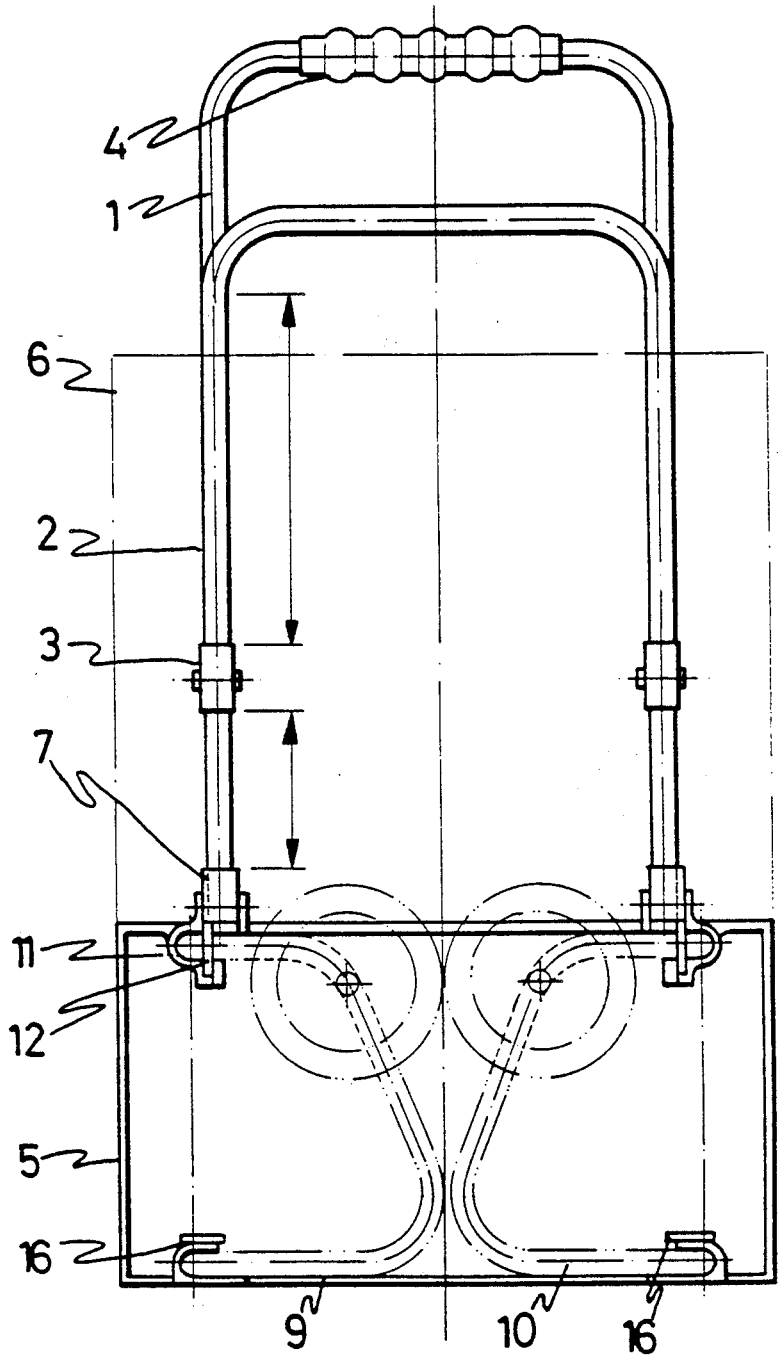
FIG. 4 is a front elevational view at the beginning of the folding operation or of the extension operation, showing the cart in an intermediate position.

The elements constituting the cart for shopping have been numerically referenced for identification purposes.

DESCRIPTION OF A PREFERRED EMBODIMENT

Thus, there are two frames 1 and 2, parallel to each other, in sliding engagement with each other, and attached to each other by double tubular sleeves 3 which are fixedly engaged to the frame 1. Frame 1 has a seizing handle 4. Frame 2 is attached at its lower part to the rigid base 5 supporting the bottom of the bag 6.

The frame 2 and the base 5 are joined to each other by piece 7, which is provided with a lug 8 which provides for extension of the wheel frameworks 9 and 10 and allows for the wheels to be folded over the lower face of the rigid base 5.

The piece 7 articulated to the rigid base 5 of the housing 11. Its lug 8, during the extending and folding movement of the cart, passes inside the zone 12 of the housing 11 in order to retain the wheel frameworks 9 and 10, respectively.

Figure 5:
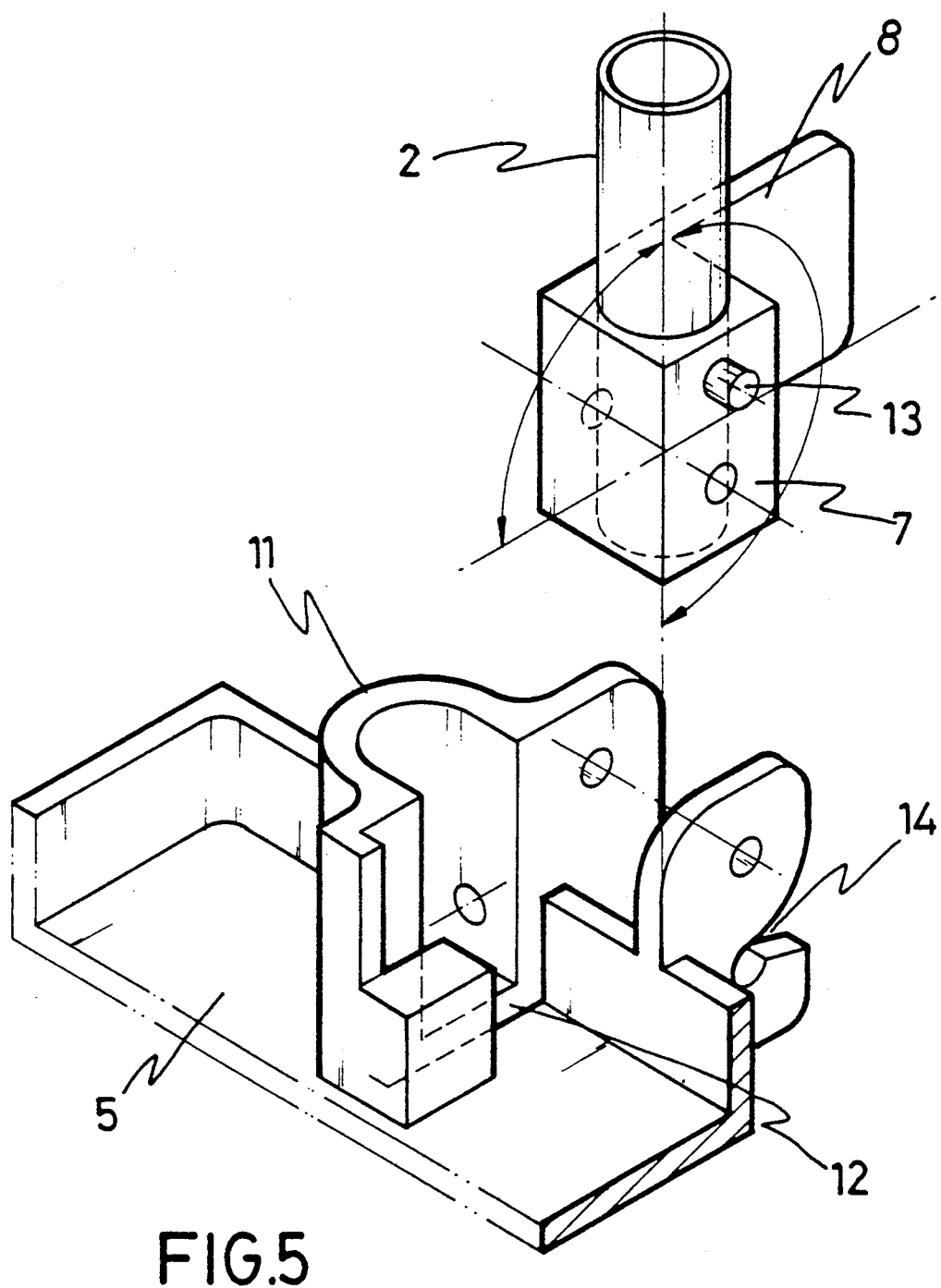
FIG. 5 Is a perspestive exploded view of the resistant base of the bag, from beneath, showing the prismatic piece whereto the wheel frameworks are articulated, as well as the inner piece of the framework.
Figure 6:
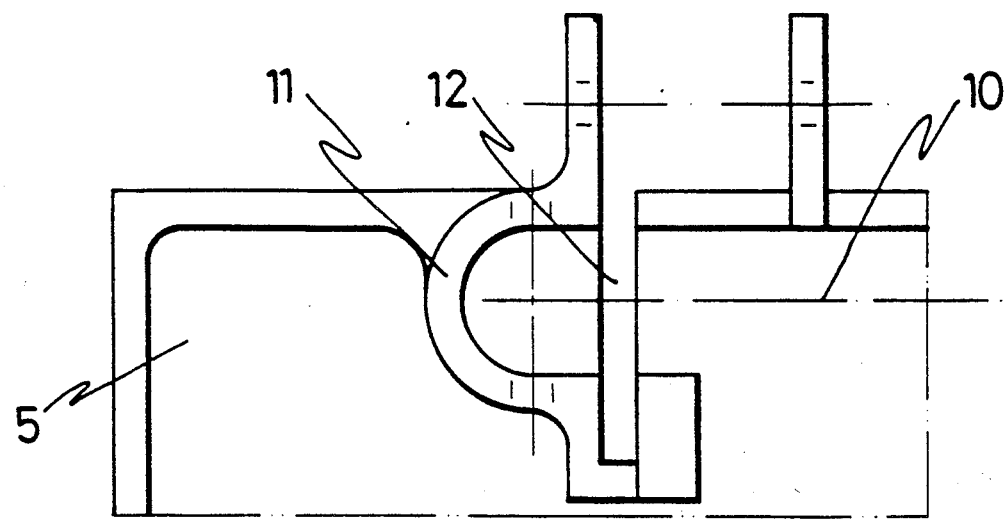
FIG. 6 is a plan view of the prismatic piece which forms part of the resistant base of the bag.
Figure 7:
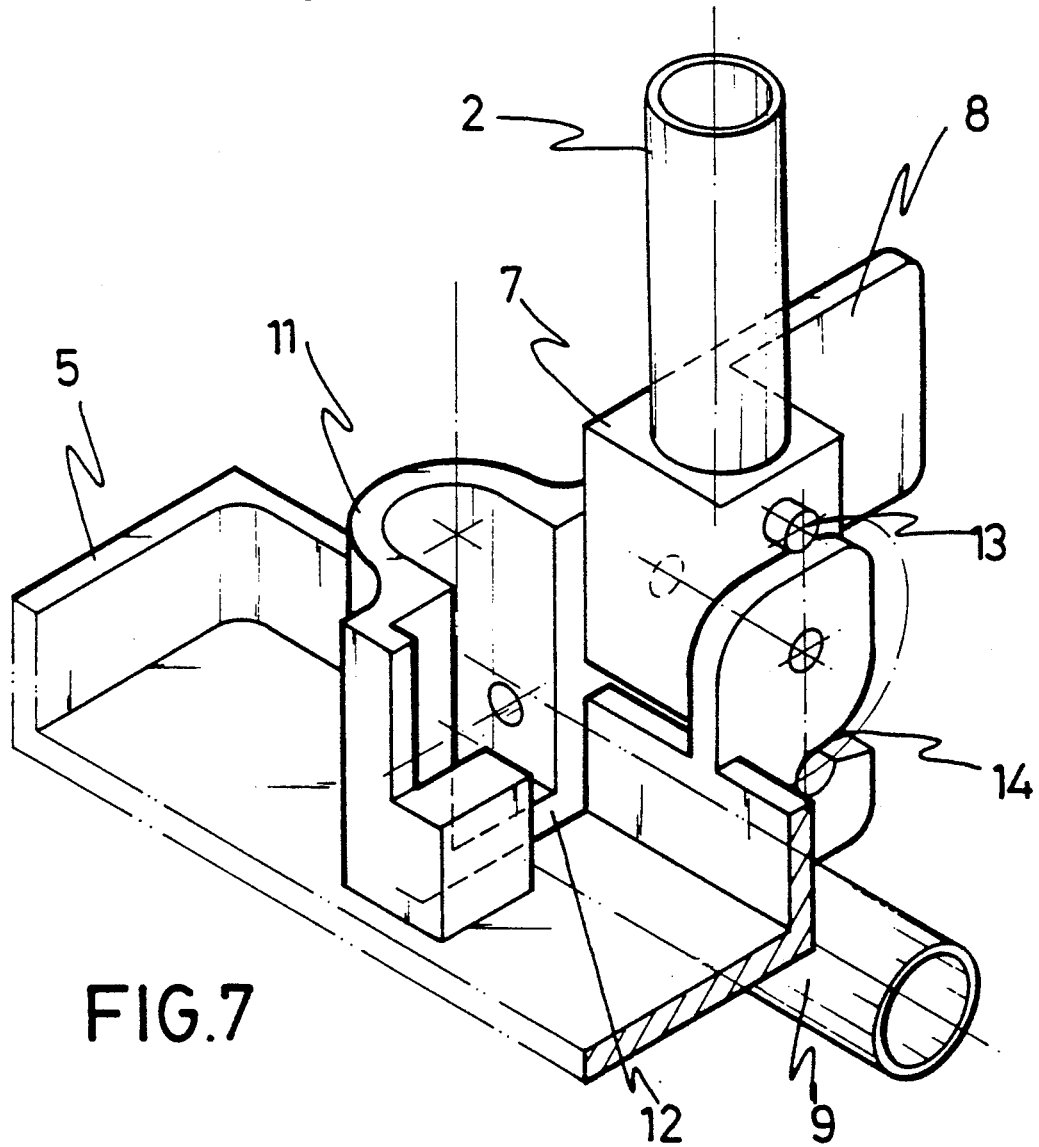
FIG. 7 is the same perspective view as in FIG. 5, wherein the lower piece of the framework is engaged in its articulation point, the lower piece and the framework carrying it being seen in a partial unfolded position. The wheel frame is folded in the resting position.
Figure 8:
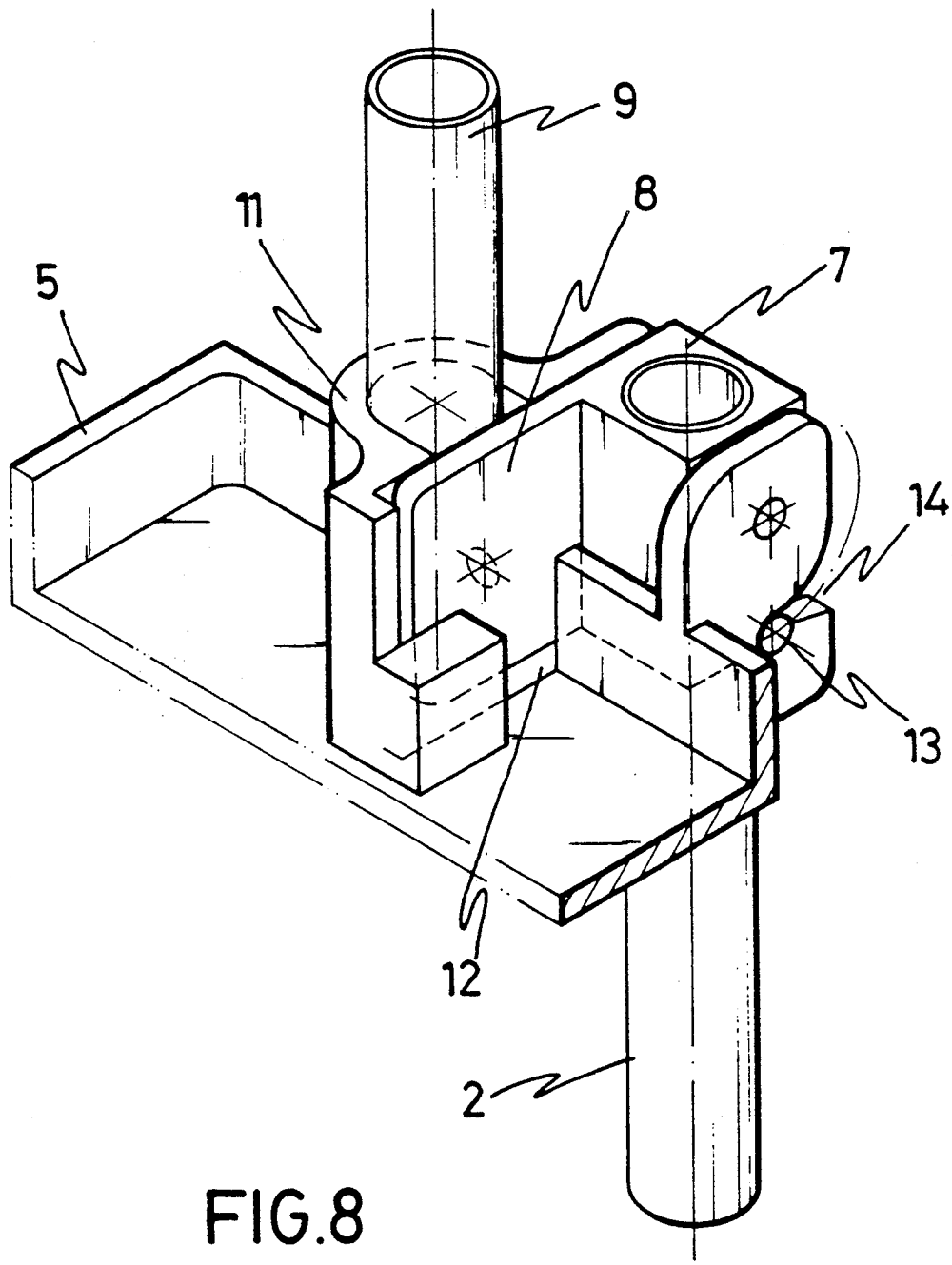
FIG. 8 is perspective view from the lower face, wherein the frame is unfolded and the lug of the lower piece has forced the wheel framework to be in the rolling position.

In the unfolded position (FIGS. 5 and 8), the pivot 13 of the piece 7 fits into the slot 14 of the housing 11 to provide the retaining element for the assembly.

Figure 9:
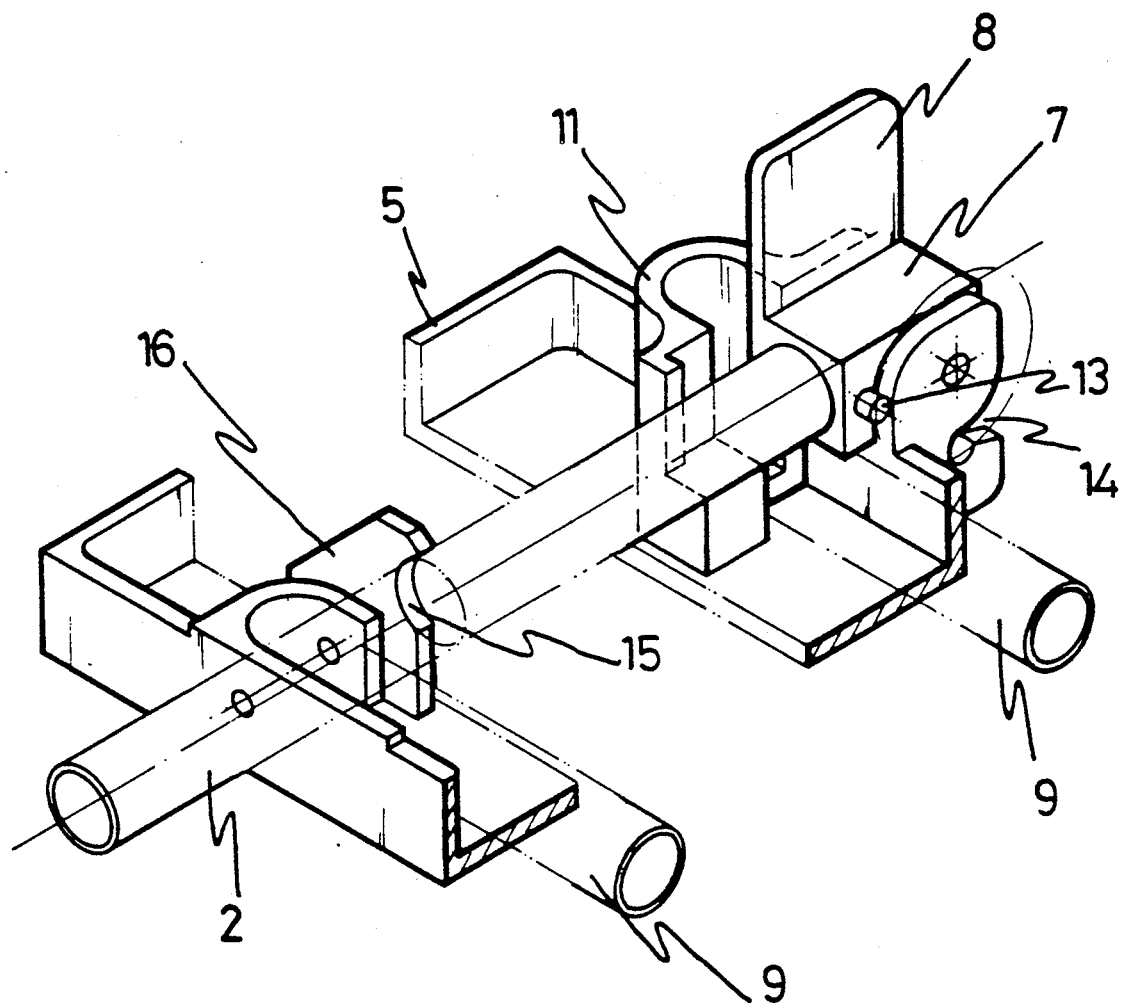
FIG. 9 is a perspective view from beneath, wherein the frame and framework are folded. This position corresponds to the folding position, such as represented in FIG. 2.
Figure 10:
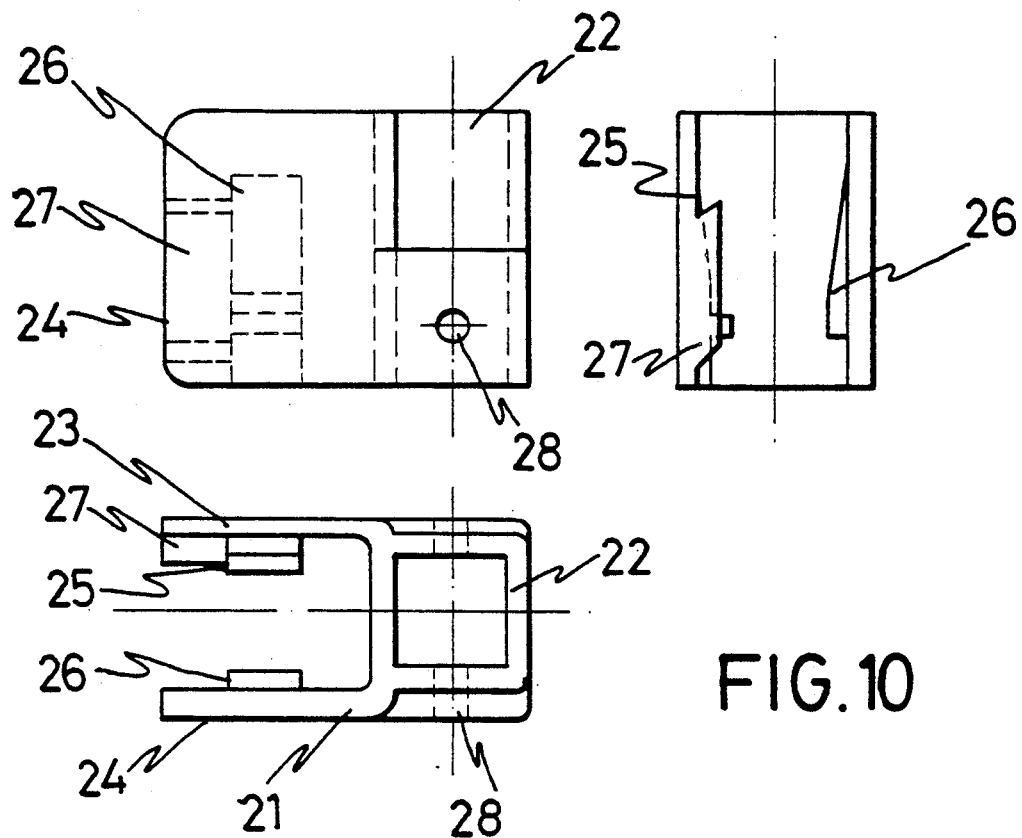
FIG. 10 represents three views of the prismatic piece disposed at the lower ends of one of the seizing frameworks, according to a preferred embodiment.
Figure 11:
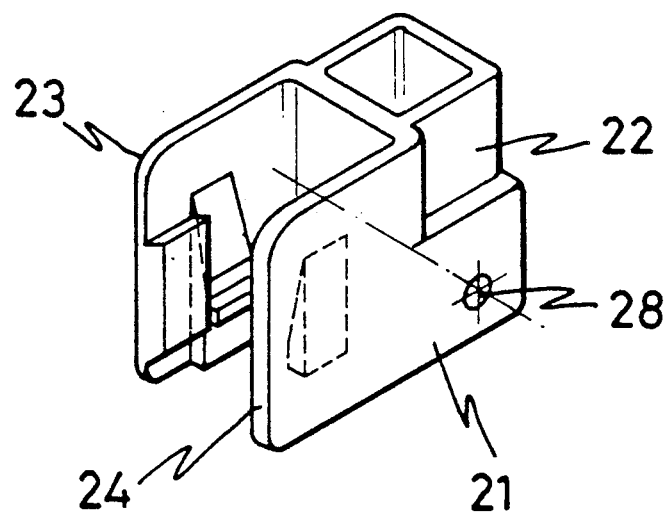
FIG. 11 shows the perspective view of said prismatic piece according to FIG. 10
Figure 12:
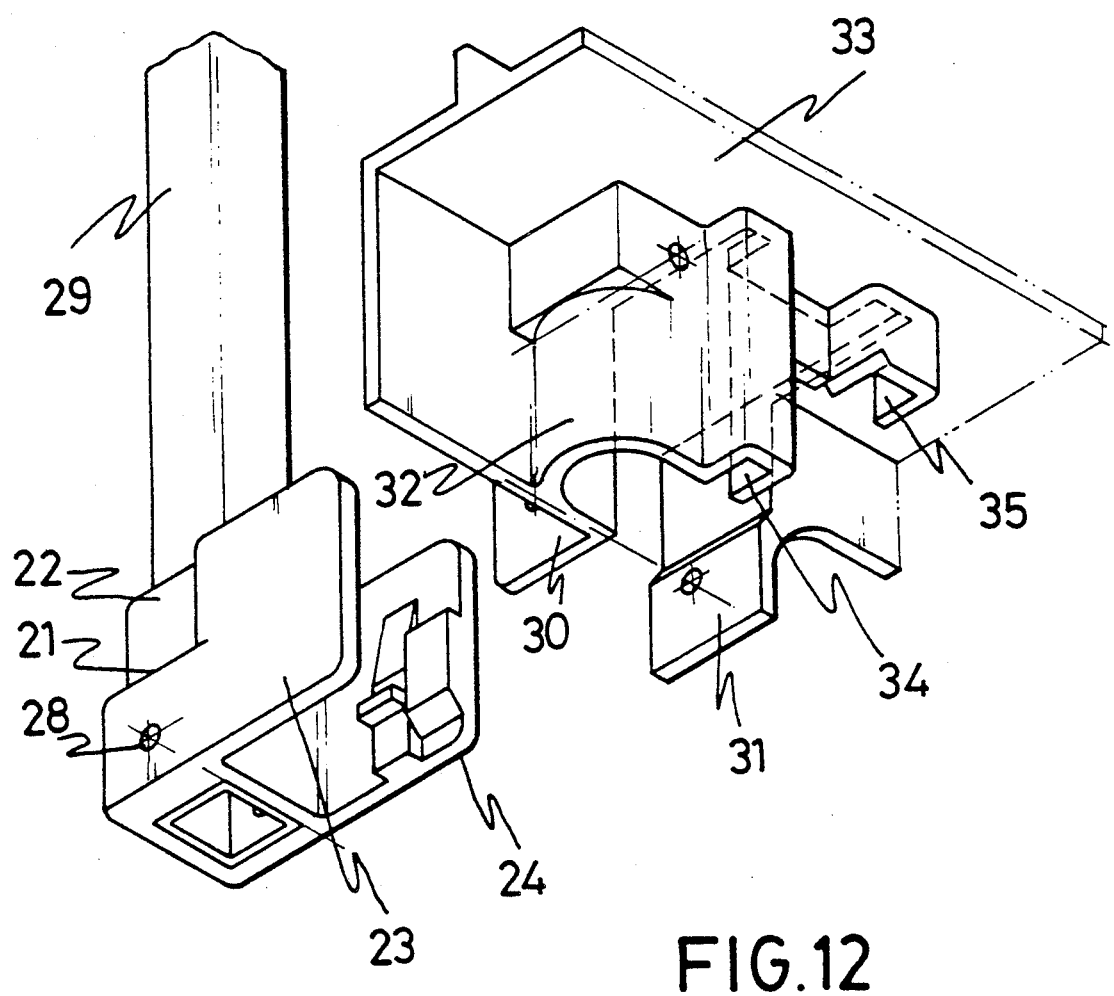
FIG. 12 shows the perspective view of the prismatic piece attached to the end of the framework, as well as the perspective view of the zone of the rigid base which forms the framework for the bottom of the bag, wherein the prismatic piece articulation lodging is located, according to FIG. 11.
Figure 13:
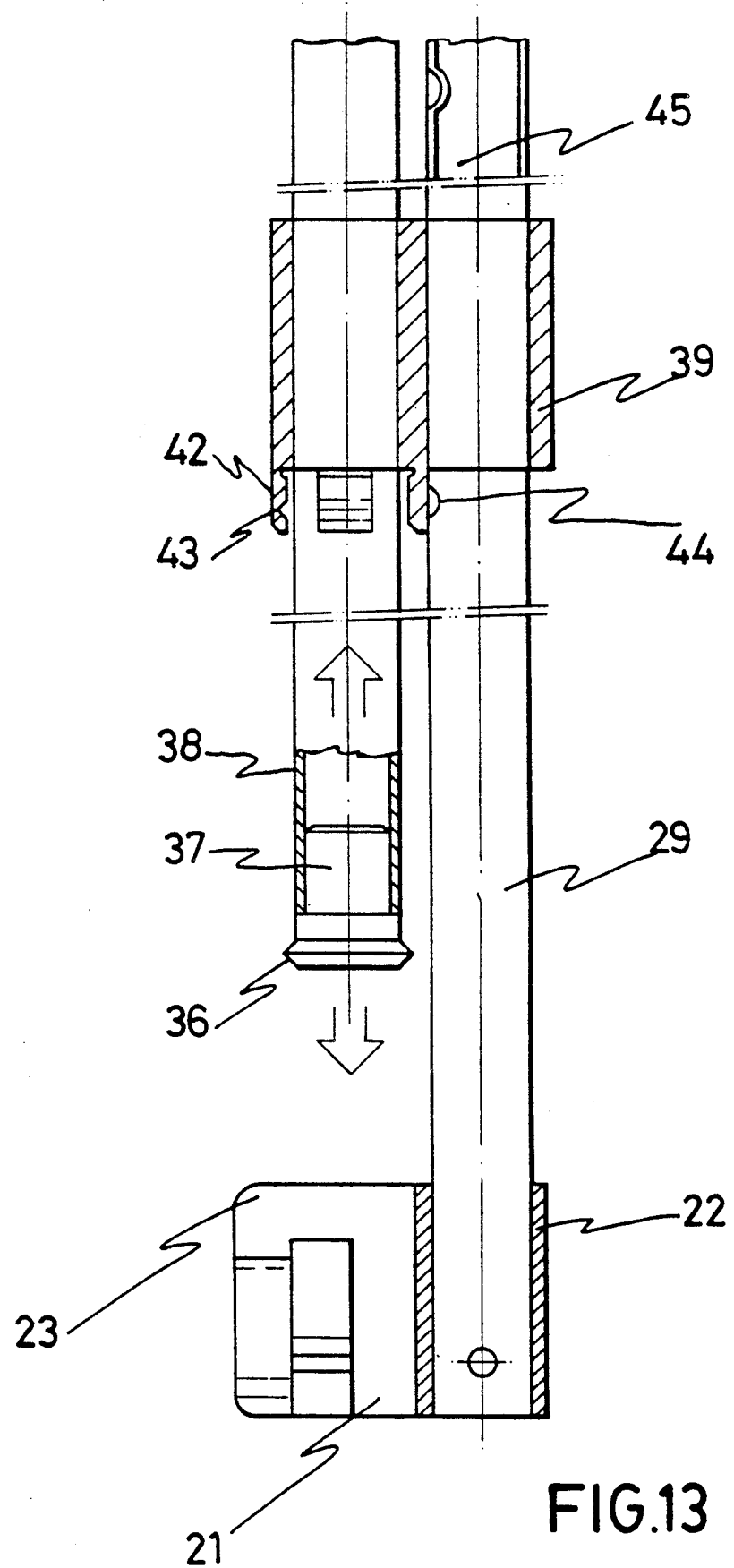
FIG. 13 represents a side elevational view of the prismatic piece according to FIG. 10 attached to the framework, and the tubular socket that joins the frameworks, with their mutual fitting elements.
Figure 14:
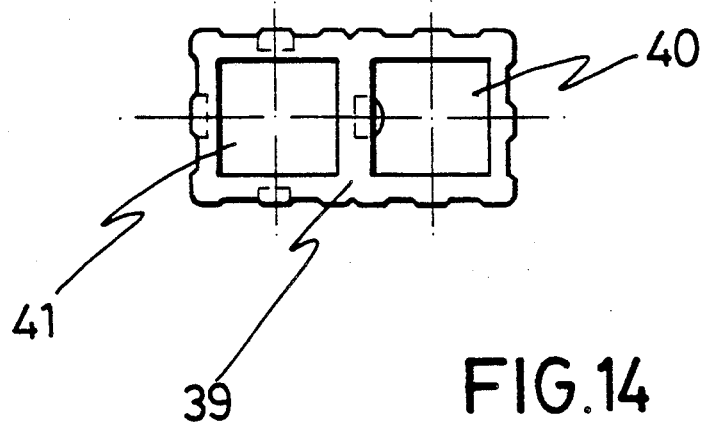
FIG. 14 is a plan view of the tubular socket according to FIG. 13.
Figure 15:
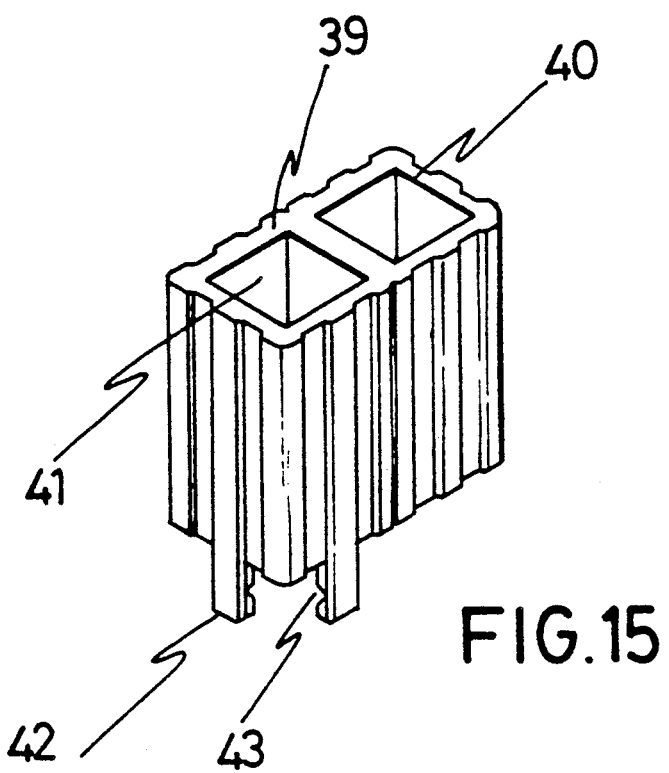
FIG. 15 is a perspective view of the tubular socket.

In the folded position (FIG. 9), the frame 2 fits into the notch 15 of the piece 16.

By means of the herein described elements, the wheel frameworks can be automatically unfolded by merely displacing the frames 1 and 2 by extending one of the frames.

It has been foreseen that the unfolded position of the frames can be maintained by means of retention elements situated either at the sleeves or in the housing that articulates the frames to the resistant base at the bottom of the bag. In any case it is advisable to reinforce the retention system in the unfolded position. According to the most improved embodiment, as shown in FIGS. 10 to 15, it is understood that the improvements provided by the invention are located in the housing articulated to one of the frames and to the rigid base; in said rigid base and in the tubular socket that enables both seizing frameworks of frames to slide therebetween, and in the mechanism that fixes the positions of the frameworks and the socket.

In accordance with the invention, said quadrangular piece 21 has a tubular extension 22. Two sides of the tubular extension extend into parallel walls 23 and 24. Inside these walls, there are vertical opposing wedge-shaped embossings 25 and 26 and a quadrangular embossing 27, the base of which constitutes a stop. The anchoring axle, not represented, is made to pass through the drilling 28 that goes through the lower part of the guadrangular piece towards one of the seizing frameworks. The axle itself, mounted in the drilling 28, goes through the walls 30 and 31 of the housing 32 which is formed at an edge of the rigid base 33. The housing 32 forms two recesses 34 and 35, parallel to each other, for the passage of walls 23 and 24 of the quadrangular piece. The lug or wall 23 has a higher flexibility index, for which purpose it has a smaller thickness that the other wall 24. The projection inside the lug 23 is intended to engage the end of said wall in order to retain the framework and the bag in the unfolded position, when it is placed in its assembly sliding inside the paths 34 and 35 provided at the platform. The projections 25 and 26 of the walls 23 and 24 retain the peripheral web of the ferrule 37. The peripheral web 36 is located at the end of the mobile frame 38.

A single-piece double socket 39 forms two paths. The first path 40 is for the frame 29 and the second path 41 is for the frame 38. Both frames move along said paths of the socket 39 in a parallel relationship.

The path 41 has extensions 42 at the lower ends of its walls and transverse grooves 43 which receive the peripheral web 36 of the ferrule 37 for retaining the frames in the extended position.

One of the extensions 42, the one corresponding and parallel to the frame 29, is provided with a semispherical embossing 44 that, in the extended position, fits the punching 45 of said frame.

It is inferred from the above description that the seizing framework, formed by two parallel frames, can be formed by sliding one of the frames until the web of the ferrule fits the projections of the flexible wall of the quadrangular piece which joins one of the frames to the rigid platform or base for supporting the bag. Flexibility has been studied so that the ferrule can disengage itself with a slight pressure, but with no possibility of fortuitous uncoupling during handing.

Similarly, in the coupling of the ferrule between the lugs of the double sockets, it is retained in the unfolded position until a certain force is exerted for the uncoupling thereof.

With these characteristics, the folding and unfolding of the bag becomes simple and efficient.

I claim:

1. A foldable shopping cart comprising a rigid base for supporting a bottom portion of a shopping bag, first and second frameworks disposed parallel to one another, first and second frames secured to said base and supporting first and second wheels, means connecting said base and frames for allowing the wheels to be folded underneath said base, said first framework being slidabale relative to said second framework from an extended position for use to a folded position for transport, said first framework being attached to an upper portion of the bag for pulling the bag from a folded position of reduced size to an extended position, said second framework being articulated to and secured adjacent an articulation axle to said base, a first member connected to said base and having a first lug which allows rotation about said axle of said second framework, said first lug passing through a slot provided in said base, to a position where said lug retains said wheels in an unfolded position by contact with the associated wheel frame, a quadrangular piece secured to a lower walls, end of one of said frameworks and havaing first and second walls, said first wall parallel to said second wall and having a greater flexibility than said second wall, an inner projection extending from an inner face of said first wall secures the framework and bag in the unfolded position by engaging said base.

2. A foldable cart as recited in claim 1, further comprising an embossing disposed on said first and second walls, said embossings facing one another to form a passage therebetween for a ferrule which surrounds a portion of one of said frameworks, said ferrule having a peripheral web to engage said embossings.

3. A foldable shopping cart as recited in claim 1, further comprising a ferrule which surrounds said one framework and a double socket with two sockets forming a guide between said frameworks with each said framework extending through a respective socket, said double socket having a plurality of notches, said ferrule having a peripheral web which engages said plurality of notches when said frameworks are in the extended position.

4. A foldable shopping cart as recited in claim 1, further comprising a double socket with two sockets and a pair of extensions projecting from one said socket, one said framework passing through said one socket, the other said framework passing through the other said socket, one of said extensions having a semi-spherically shaped embossing extending from its outer face to engage a punching formed in the other said framework to secure the cart in the extended position.

5. A foldable shopping cart as recited in claim 2, wherein said embossings are notches.

6. A foldable shopping cart as recited in claim 2, further comprising a double socket with two sockets and a pair of extensions projecting from one said socket, one said framework passing through said one socket, the other said framework passing through the other said socket, one of said extensions having a semi-spherically shaped embossing extending from its outer face to engage a punching formed in the other said framework to secure the cart in the extended position.

7. A foldable shopping cart as recited in claim 3, further comprising a double socket with two sockets and a pair of extensions projecting from one said socket, one said framework passing through said one socket, the other said framework passing through the other said socket, one of said extensions having a semi-spherically shaped embossing extending from its outer face to engage a punching formed in the other said framework to secure the cart in the extended position.

* * * * *